United States Patent
Nakamura et al.

(10) Patent No.: US 11,780,303 B2
(45) Date of Patent: Oct. 10, 2023

(54) STRIKER MOUNTING STRUCTURE

(71) Applicants: KABUSHIKI KAISHA TOYOTA JIDOSHOKKI, Kariya (JP); TOYOTA JIDOSHA KABUSHIKI KAISHA, Toyota (JP)

(72) Inventors: Shu Nakamura, Kariya (JP); Hironori Tajima, Kariya (JP); Kazuhiko Sato, Kariya (JP); Mikio Nakashima, Toyota (JP); Hiroki Kawamura, Okazaki (JP); Tsuyoshi Kato, Hekinan (JP); Satoshi Maekawa, Toyota (JP); Hirokazu Shirouzu, Tsukuba (JP); Kanichi Saito, Toyota (JP)

(73) Assignees: KABUSHIKI KAISHA TOYOTA JIDOSHOKKI, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 681 days.

(21) Appl. No.: 16/839,467

(22) Filed: Apr. 3, 2020

(65) Prior Publication Data

US 2020/0324629 A1    Oct. 15, 2020

(30) Foreign Application Priority Data

Apr. 10, 2019  (JP) ................. 2019-074494

(51) Int. Cl.
*B60J 5/04*   (2006.01)
*E05B 85/04*  (2014.01)
*E05B 79/02*  (2014.01)

(52) U.S. Cl.
CPC ............. *B60J 5/0458* (2013.01); *E05B 79/02* (2013.01); *E05B 85/04* (2013.01); *Y10T 292/68* (2015.04);
(Continued)

(58) Field of Classification Search
CPC .... B62D 21/157; B62D 25/04; B62D 25/025; Y10S 292/53; Y10S 292/54;
(Continued)

(56) References Cited

U.S. PATENT DOCUMENTS 4,323,271 A * 4/1982 Taniguchi ............ B62D 25/04
                                                    292/341.18
4,470,626 A * 9/1984 Gergoe ................ E05B 85/045
                                                     292/DIG. 43
(Continued)

FOREIGN PATENT DOCUMENTS

DE   102004034125 A1     2/2006
DE   102018007926 A1 *   2/2020
(Continued)

*Primary Examiner* — Christine M Mills
*Assistant Examiner* — Faria F Ahmad
(74) *Attorney, Agent, or Firm* — Sughrue Mion, PLLC

(57) ABSTRACT

A striker mounting structure is configured to mount a striker on a vehicle body. A hook fixed to a door is hooked to the striker. A reinforcement formed with an insertion hole may be attached to the vehicle body. An outer panel covering a reinforcement may include a striker mounting surface spaced from the reinforcement. A reinforcement member may be fixed to the striker and the striker mounting surface. Two or more connecting rods may extend from the reinforcement member. Each of the connecting rods may include locking portions, which are inserted in the insertion hole formed in the reinforcement.

19 Claims, 9 Drawing Sheets

(52) U.S. Cl.
CPC ........ *Y10T 292/696* (2015.04); *Y10T 292/705* (2015.04)

(58) Field of Classification Search
CPC ............ Y10T 292/696; Y10T 292/705; Y10T 292/68; B60J 5/0458; E05B 17/2084; E05B 79/02; E05B 85/04
See application file for complete search history.

(56) References Cited

U.S. PATENT DOCUMENTS

| | | | | |
|---|---|---|---|---|
| 4,602,813 | A * | 7/1986 | Gergoe | E05B 85/045 292/DIG. 43 |
| 4,756,565 | A * | 7/1988 | Myslicki | E05B 85/045 292/DIG. 43 |
| 4,946,208 | A * | 8/1990 | Myslicki | E05B 15/0245 292/216 |
| 4,998,759 | A * | 3/1991 | Peterson | E05B 85/045 292/DIG. 53 |
| 6,038,740 | A * | 3/2000 | Hoger | E05D 7/04 16/382 |
| 6,735,822 | B2 * | 5/2004 | Spurr | B60J 5/0431 16/388 |
| 6,814,401 | B2 * | 11/2004 | Takada | E05B 85/045 296/202 |
| 7,909,372 | B2 * | 3/2011 | Yamada | E05B 85/045 292/340 |
| 8,226,157 | B2 * | 7/2012 | Mackenzie | B62D 25/04 296/193.06 |
| 8,371,640 | B2 * | 2/2013 | Horneck | B60N 2/28 |
| 8,439,409 | B2 * | 5/2013 | Uto | E05C 3/24 292/216 |
| 10,532,668 | B2 * | 1/2020 | Park | B60N 2/28 |
| 10,882,561 | B2 * | 1/2021 | Nakashima | B62D 25/04 292/341.18 |
| 2001/0022456 | A1 | 9/2001 | Kitagawa | |
| 2004/0093917 | A1 * | 5/2004 | Sullivan | E05C 19/184 70/164 |
| 2005/0218671 | A1 * | 10/2005 | Miyake | E05B 85/045 292/341.16 |
| 2008/0217932 | A1 * | 9/2008 | Yamada | B60N 2/366 292/340 |
| 2009/0250947 | A1 * | 10/2009 | Wiese | E05B 85/045 292/216 |
| 2010/0320778 | A1 * | 12/2010 | Stechschulte | E05B 85/045 292/216 |
| 2011/0291442 | A1 | 12/2011 | Oirschot | |
| 2011/0316294 | A1 * | 12/2011 | Kim | B62D 25/04 292/340 |
| 2014/0053388 | A1 * | 2/2014 | Mazzei | E05C 3/24 292/216 |
| 2019/0225276 | A1 | 7/2019 | Nakashima et al. | |
| 2020/0284071 | A1 * | 9/2020 | Choi | E05B 85/045 292/340 |

FOREIGN PATENT DOCUMENTS

| | | |
|---|---|---|
| JP | 6-40259 A | 2/1994 |
| JP | 2001-277854 A | 10/2001 |
| JP | 2003-081137 A | 3/2003 |
| JP | 2018-138408 A | 9/2018 |
| JP | 2019-127262 A | 8/2019 |

* cited by examiner

STRIKER MOUNTING STRUCTURE

CROSS-REFERENCE TO RELATED APPLICATIONS

This application claims priority to Japanese patent application serial number 2019-74494 filed Apr. 10, 2019 the contents of which are incorporated herein by reference in its entirety for all purposes.

BACKGROUND

The present invention relates to a striker mounting structure.

A catcher mounting support structure (corresponding to a striker mounting structure) may be provided for vehicle doors. This mounting structure prevents a door from entering a passenger compartment in the event of a side collision with a vehicle body.

The mounting structure includes a reinforcement and a tubular member (corresponding to a connecting rod) mounted to a vehicle body. The reinforcement has, for example, substantially a box shaped cross section with a reinforcement front and a reinforcement rear. One end of the tubular member is fixed to the reinforcement front and the other end to the reinforcement rear.

The mounting structure is provided on a vehicle body side member, for example, a rear wheel arch part (corresponding to a vehicle body). A catcher (corresponding to a striker) is mounted on the tubular member by screw tightening a mounting bolt(s). This mounting structure is very resistive to input of an impact load in the event of a side collision.

The mounting structure is fixed to the rear wheel arch part. Therefore, the impact load generated in the event of a side collision is directly applied to the reinforcement via the mounting structure. As a result, the reinforcement may be easily deformed due to the impact.

SUMMARY

According to one aspect of the present embodiment, the present disclosure relates to a striker mounting structure that is configured to mount a striker on a vehicle body. A hook fixed on a door is hooked to the striker. A reinforcement formed with an insertion hole(s) may be attached to the vehicle body. An outer panel covering the reinforcement may include a striker mounting surface arranged to be spaced apart from the reinforcement. The reinforcement member may be fixed to the striker and the striker mounting surface. Two or more connecting rods may extend from the reinforcement member. Each of the connecting rods may include locking portions, which are inserted in the insertion hole(s) formed in the reinforcement.

Therefore, when an impact is applied to a lateral side of the vehicle body, the door is deformed and the hook of the door pulls the striker. The reinforcement member and the connecting rods move together with the striker, such that the locking portions of the connecting rods strike a hole wall surface of the insertion hole(s) of the reinforcement. Consequently, the force caused by the collision is not directly, but rather indirectly, applied to the reinforcement. In addition, since more than one connecting rod is provided, the force caused by the collision is applied to the reinforcement at a plurality of spots. As a result, the reinforcement is gradually deformed, such that the door is favorably prevented from entering the passenger compartment. Further, movement of the striker is prevented by more than one connecting rod. Therefore, the striker becoming inclined during the collision may be prevented, which is a problem with only one connecting rod.

According to another aspect of the present embodiment, the hook may be provided at a rear end of the door. The striker mounting surface may be located in front of the reinforcement. Therefore, the impact is reliably transmitted to the reinforcement via the striker mounting surface, when the hook of the door moves forward due to the collision with the door.

According to another aspect of the present embodiment, the insertion hole(s) may open away from the passenger compartment. The connecting rod may include a rod portion extending in a forward/backward direction of a vehicle. The locking portions may extend from the rod portion toward the inside of the passenger compartment, so as to be inserted in the insertion hole(s). Consequently, bent portions are formed between the rod and locking portions. The impact applied to the vehicle body may thus be additionally absorbed due to the deformation of the bent portions.

According to another aspect of the present embodiment, a reinforcement member is abutted to a rear surface of the striker mounting surface, the surface facing the reinforcement. The striker is abutted to a front surface, which is an opposite side of the rear surface of the striker mounting surface. The striker and the reinforcement member thus cooperate to clamp the striker mounting surface. In this way, the striker and the reinforcement member can be securely mounted to the striker mounting surface.

According to another aspect of the present embodiment, two or more connecting rods may be arranged in line in an upward/downward direction. Therefore, the impact force is dispersed in the upward/downward direction. The impact force due applied to the lateral side of the vehicle body is further retained in the reinforcement. As a result, the striker is reliably prevented from being inclined in the upward/downward direction.

According to another aspect of the present embodiment, the first and second connecting rods of the two or more connecting rods may extend from the reinforcement member. The second connecting rod extends such that the interval between the first connecting rod increases or reduces in a direction away from the reinforcement member. Therefore, since the angles of the first connecting rod and the second connecting rod with respect to the reinforcement member are respectively different, the force applied to the reinforcement is dispersed. The impact force is thus effectively retained in the reinforcement. Further, the first connecting rod cooperates with the second connecting rod, so as to effectively prevent the striker from rotating or tilting.

According to another aspect of the present embodiment, a reinforcement plate may be provided so as to extend from the reinforcement member toward the reinforcement. Therefore, the reinforcement member is reinforced by the reinforcement plate, such that the impact force can be effectively retained by the reinforcement member.

According to another aspect of the present embodiment, the connecting rods are fixed to the reinforcement plate. Thus, the reinforcement plate and the connecting rods cooperate to reinforce the reinforcement member. As a result, the impact force can be more effectively retained by the reinforcement member.

According to another aspect of the present embodiment, one of the connecting rods extends along the upper edge of the reinforcement plate and is fixed to the reinforcement plate. The other connecting rod extends along the lower edge of the reinforcement plate and is fixed to the reinforcement plate. These two connecting rods are fixed to the reinforcement plate such that the interval between the two connecting rods increases or reduces in a direction away from the reinforcement member.

The two connecting rods are thus reinforced by the reinforcement plate. Additionally, the impact force applied to the lateral side of the vehicle body is dispersed in the upward/downward direction and retained in the reinforcement. As a result, the striker is reliably prevented from being inclined in the upward/downward direction. Furthermore, since the angles of the first connecting rod and the second connecting rod with respect to the reinforcement member are respectively different, the force applied to the reinforcement is more dispersed. The impact force is thus effectively retained in the reinforcement.

According to another aspect of the present embodiment, the reinforcement plate is a separate component from the reinforcement member and is attached to the reinforcement member. Therefore, the shape of the reinforcement plate can be flexibly selected and may be formed, for example, in a shape corresponding to the shape of the reinforcement.

According to another aspect of the present embodiment, the reinforcement plate may have a ridge line extending in the forward/backward direction, so as to form a convex shape in a direction away from the passenger compartment or toward the passenger compartment. Therefore, the strength of the reinforcement plate in the forward/backward direction may be greater. On the other hand, the reinforcement plate may be easily bent about the ridge lines in the upward/downward direction, so that the impact can be further absorbed by the reinforcement plate.

DETAILED DESCRIPTION

Figure 1:
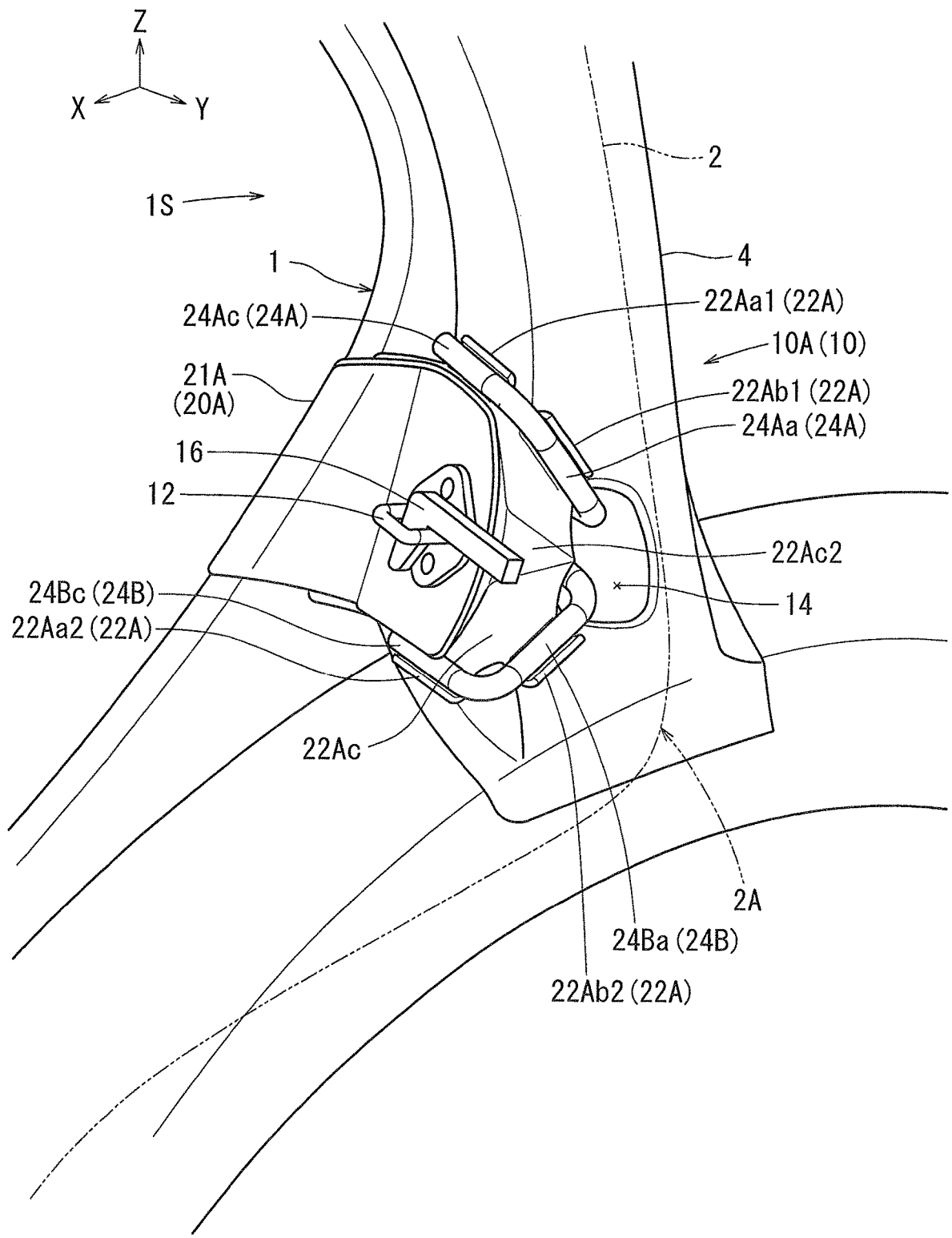
FIG. 1 is a perspective view of an entire striker mounting structure according to a first embodiment.

A strike mounting structure will be described with reference to drawings. The striker mounting structure may include, for example, a striker mounting unit configured to mount a striker on a vehicle body. The X-axis, Y-axis, and Z-axis illustrated in the drawings intersect orthogonally with each other. For the purposes of the following discussions, with reference to the vehicle body 1, an X-direction is set as "forward," a direction opposite to the X-direction as "backward," a Z-direction as "upward," and a direction opposite to the Z-direction as "downward." The Y-direction is set as "left" and a direction opposite to the Y-direction as "right."

Figure 3:
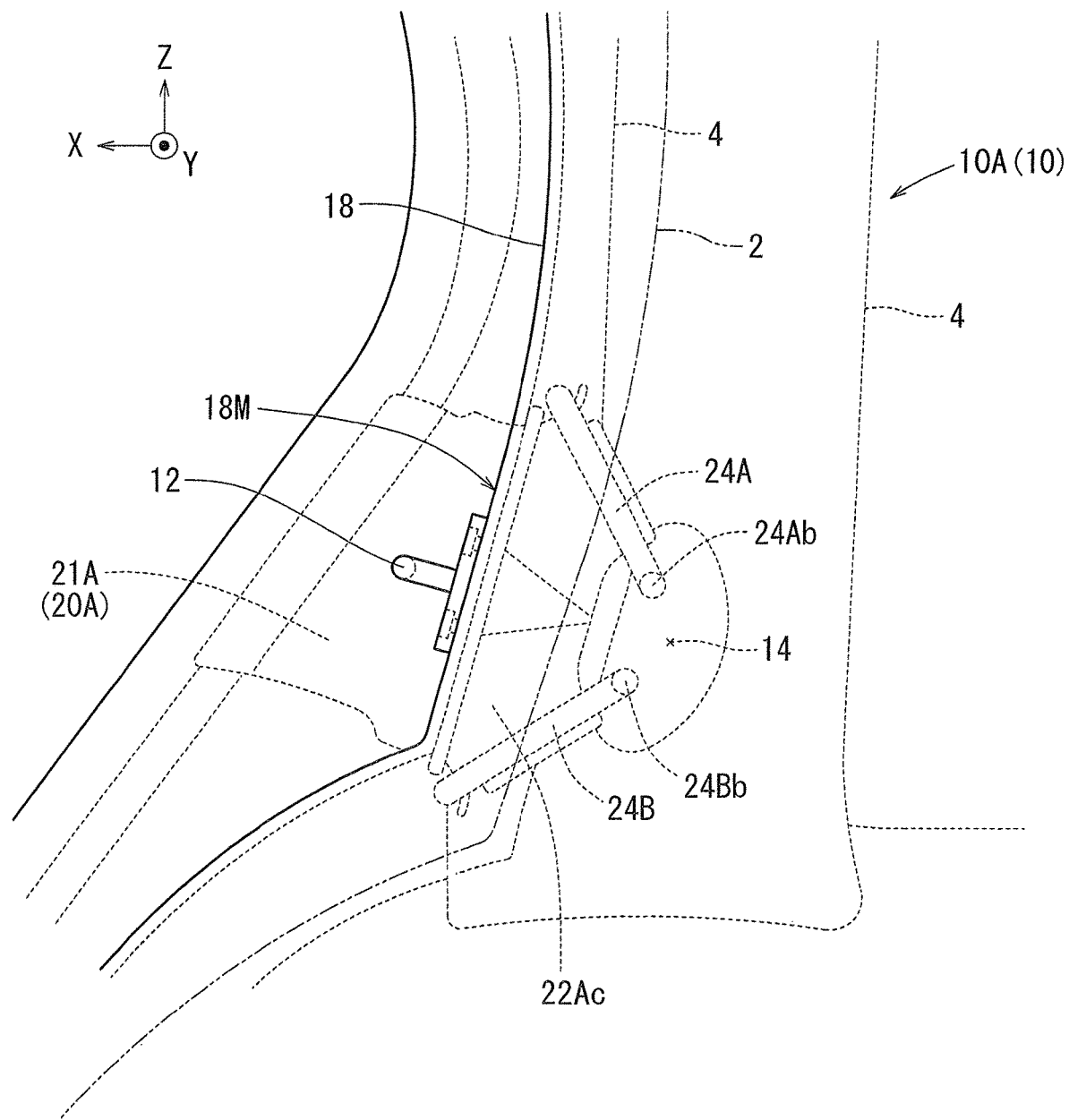
FIG. 3 is an explanatory view illustrating a detailed structure of the striker mounting structure of FIG. 1.

In FIG. 1, an outer panel 18 is not shown. FIG. 1 shows a striker mounting structure for a door 2 provided at a left rear side portion 1S of a vehicle body 1. A reinforcement 4 may be provided at the rear side portion 1S of the vehicle body 1. As shown in FIG. 3, an outer panel 18 may cover the reinforcement 4, a reinforcement member 20A, connecting rods 24A, 24B, and a reinforcement plate 22Ac. As also shown in FIG. 3, a striker 12 may not be covered by the outer panel 18.

A hook 16 may be provided on a door rear end portion 2A of the door 2. When the door 2 is closed, the hook 16 may lock in the striker 12. When the hook 16 is locked in the striker 12, the striker 12 prevents the door 2 from entering the passenger compartment in the event of a side collision. The below described striker mounting structure 10A (10) is configured to allow the striker 12 to be mounted on the vehicle body.

Figure 2:
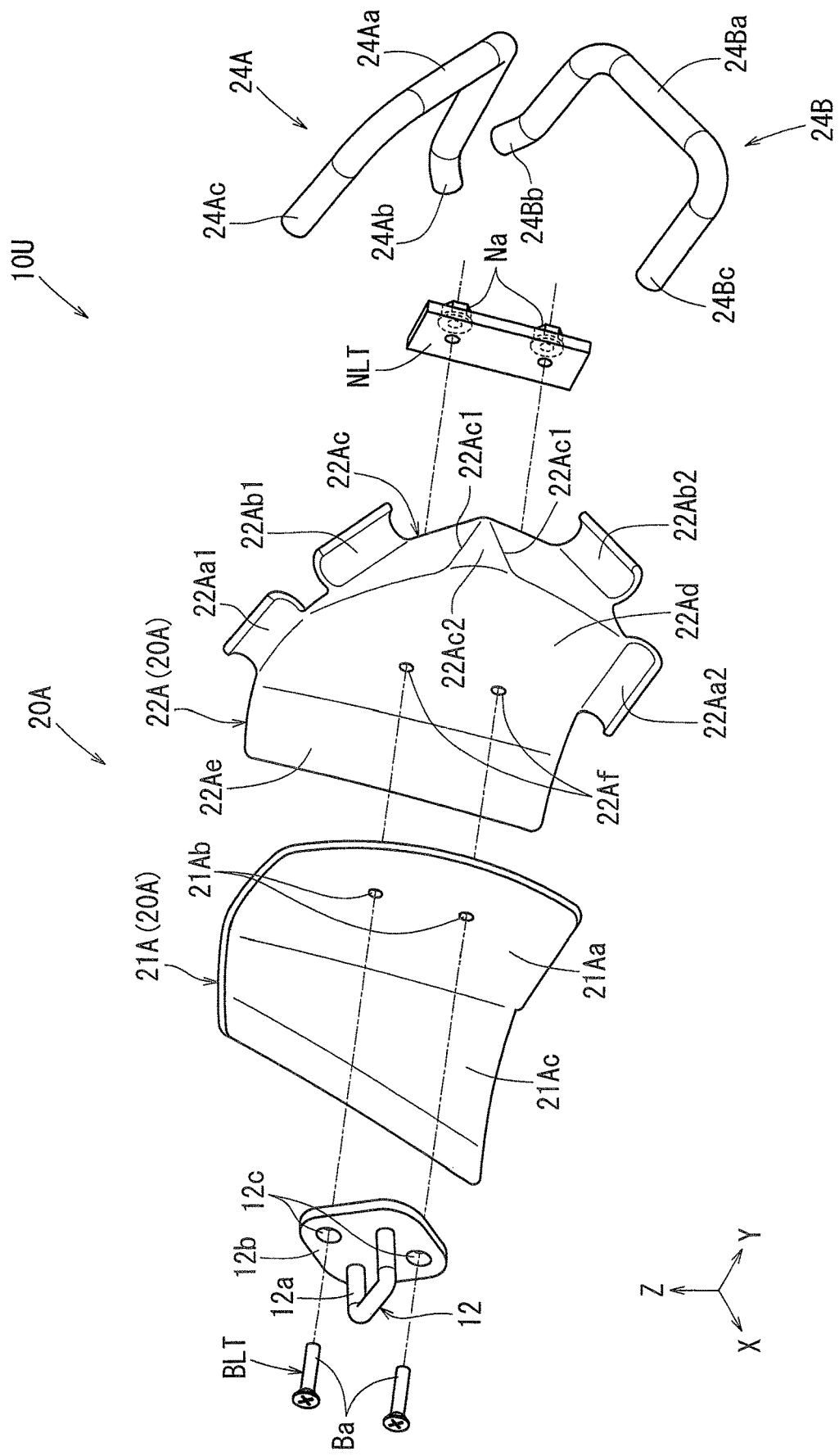
FIG. 2 is an exploded perspective view of the striker mounting unit of FIG. 1.

The striker 12 may be mounted on the vehicle body 1 and be one component of a striker mounting unit 10U. As shown in FIG. 2, the striker mounting unit 10U may include a striker 12, a reinforcement member 20A, connecting rods 24A, 24B, bolts BLT, and a nut plate NLT.

As shown in FIG. 3, the reinforcement 4 may be provided with an insertion hole 14. The insertion hole 14 may open toward a direction away from the passenger compartment, which is the direction opposite to the interior of the passenger compartment. The outer panel 18 may include a striker mounting surface 18M on the front side thereof.

The striker mounting surface 18M may be provided so as to be spaced from the reinforcement 4 in the forward/backward direction of the vehicle body.

As shown in FIG. 2, the reinforcement member 20A may include two reinforcement members 21A, 22A. The striker 12 may be fixed to one of the reinforcement members (reinforcement member 20A in this embodiment). Specifically, the striker 12 may include a striker plate 12b disposed on the striker mounting surface 18M (see FIG. 3) and a striker rod 12a, which may be substantially U-shaped, projecting from the striker plate 12b.

A mounting plate portion 21Aa of the reinforcement member 21A, shown in FIG. 2, may be disposed on the rear side of the striker mounting surface 18M, as shown in FIG. 3. The reinforcement member 22A is disposed on the rear side of the mounting plate portion 21Aa of the other reinforcement member 21A. The nut plate NLT is disposed on the rear side of the reinforcement member 22A. Legs Ba of the bolts BLT are sequentially inserted in holes 12c in the striker 12, holes in the striker mounting surface 18M, and each of the holes 21Ab, 22Af in the corresponding reinforcement members 21A, 22A. The front ends of the legs Ba of the bolts BLT are screwed into nuts Na provided on the nut plate NLT. In this way, the striker 12 is fixed on the striker mounting surface 18M, together with the reinforcement member 20A, using the bolts BLT and nut plate NLT.

Referring to FIGS. 1 and 2, the reinforcement member 21A may be formed, for example, in an L-shape in a top view. The reinforcement member 21A may include a mounting plate portion 21Aa and a lateral wall 21Ac rising from one end edge of the mounting plate portion 21Aa. The mounting plate portion 21Aa faces the reinforcement 4, with a gap formed therebetween. The mounting plate portion 21Aa may have a shape which generally follows a corresponding surface of the reinforcement 4. Two holes 21Ab are formed in the mounting plate portion 21Aa, into which the bolts BLT may be inserted. The reinforcement member 22A may be formed in a shape to generally conform to the shape of the reinforcement member 21A. A reinforcement plate 22Ac may be formed at an end of the reinforcement member 22A directed toward the outside of the passenger compartment. The reinforcement plate 22Ac may be oriented in the direction away from the passenger compartment.

As shown in FIG. 2, the connecting rods 24A, 24B may have a U-shaped configuration. The connecting rods 24A, 24B may respectively include rod portions 24Aa, 24Ba, locking portions 24Ab, 24Bb, and fixing end portions 24Ac, 24Bc. The locking portions 24Ab, 24Bb extend from one end of the corresponding rod portions 24Aa, 24Ba (for example, ends close to each other, specifically, a lower end of the rod portion 24Aa and an upper end of the rod portion 24Ba) in the direction toward the inside of the passenger compartment. The fixing end portions 24Ac, 24Bc extend from the other end of the corresponding rod portions 24Aa, 24Ba (for example, ends far from each other, specifically, an upper end of the rod portion 24Aa, a lower end of the rod portion 24Ba) in the direction toward the inside of the passenger compartment. The locking portions 24Ab, 24Bb are inserted in the same insertion hole 14 (see FIG. 3) formed in the reinforcement 4. The rod portions 24Aa, 24Ba serve to connect the locking portions 24Ab, 24Bb with the fixing end portions 24Ac, 24Bc.

As shown in FIG. 2, the reinforcement member 22A may have substantially a Z-shape as viewed from the top. The reinforcement member 22A may include a plate-like main body 22Ad, a flange 22Ae, and a reinforcement plate 22Ac. The flange 22Ae extends from an inner edge, which is an edge nearer the passenger compartment, of the plate-like main body 22Ad in a direction away from the reinforcement 4 (see FIG. 1), for example, in the forward direction. The flange 22Ae may be positioned along a passenger compartment inner side of the lateral wall 2 1Ac of the reinforcement member 21A. The reinforcement plate 22Ac extends from a passenger compartment outer edge of the plate-like main body 22Ad in a direction toward the reinforcement 4, for example, in the backward direction.

As shown in FIG. 2, the reinforcement member 22A may include fixing portions 22Aa1, 22Aa2, 22Ab1, and 22Ab2, to which the connecting rods 24A, 24B are configured to be attached. The fixing portions 22Aa1, 22Aa2 may extend from opposite ends of the plate-like main body 22Ad, for example, the upper and lower ends. The fixing portions 22Aa1, 22Aa2 may have, for example, a semicircular bottom surface, which conforms to the shape of the fixing end portions 24Ac, 24Bc of the connecting rods 24A, 24B. The fixing end portions 24Ac, 24Bc of the connecting rods 24A, 24B are welded to the inner peripheral surfaces of the fixing portions 22Aa1, 22Aa2. The fixing portions 22Ab1, 22Ab2 extend from opposite ends of the reinforcement plate 22Ac, for example, upper and lower ends. The fixing end portions 22Ab1, 22Ab2 may have, for example, a semicircular bottom surface, which conforms to the shape of the rod portions 24Aa, 24Ba of the connecting rods 24A, 24B. The rod portions 24Aa, 24Ba of the connecting rods 24A, 24B are welded to the inner peripheral surfaces of the fixing portions 22Ab1, 22Ab2.

As shown in FIGS. 1 and 2, the connecting rods 24A, 24B are attached to the reinforcement member 20A. The locking portions 24Ab, 24Bb of the connecting rods 24A, 24B project from the reinforcement member 20A toward the reinforcement 4. The locking portions 24Ab, 24Bb are inserted into the insertion hole 14 formed in the reinforcement 4. The connecting rods 24A, 24B are arranged vertically in the upward/downward direction with respect to each other. The rod portions 24Aa, 24Ba of the connecting rods 24A, 24B extend in the forward/backward direction. The spacing between the rod portions 24Aa, 24Ba gradually reduces in the backward direction.

As shown in FIG. 2, the reinforcement plate 22Ac may include two ridge lines 22Ac 1 extending in the forward/backward direction. The reinforcement plate 22Ac may also include a top portion 22Ac2 formed, for example, to have substantially a triangular shape between the ridge lines 22Ac1. The reinforcement plate 22Ac is raised in the thickness direction, such that the top portion 22Ac2 faces away from the passenger compartment. As an alternative to the two ridge lines 22Ac 1 and the top portion 22Ac2, only one ridge line 22Ac 1 may be provided. The reinforcement plate 22Ac is raised in the thickness direction, such that the ridge lines 22Ac1 are located outside of the passenger compartment.

Figure 4:
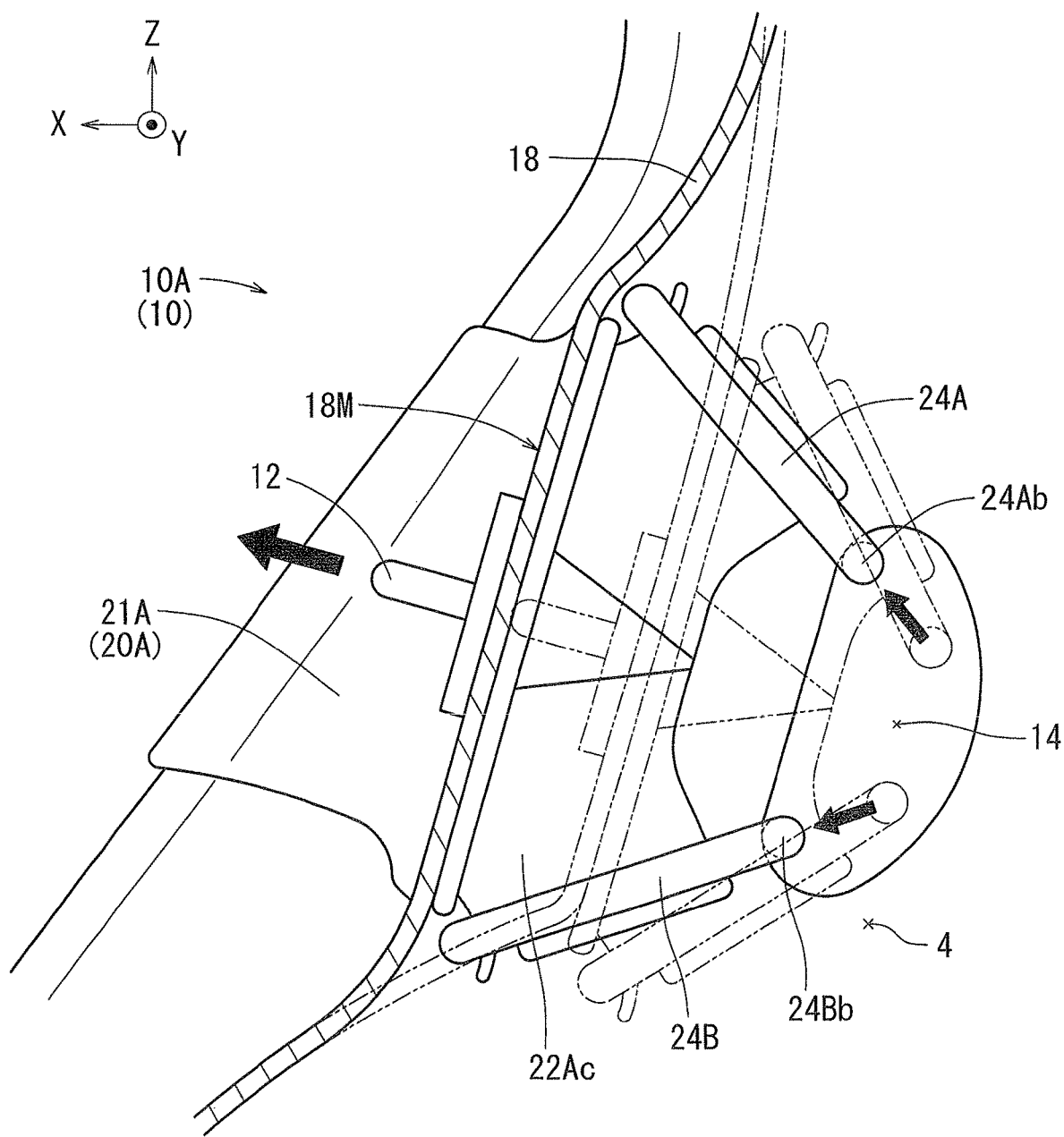
FIG. 4 is an explanatory view illustrating a movement of the striker mounting structure of FIG. 1 in the event of a side collision.
Figure 5:
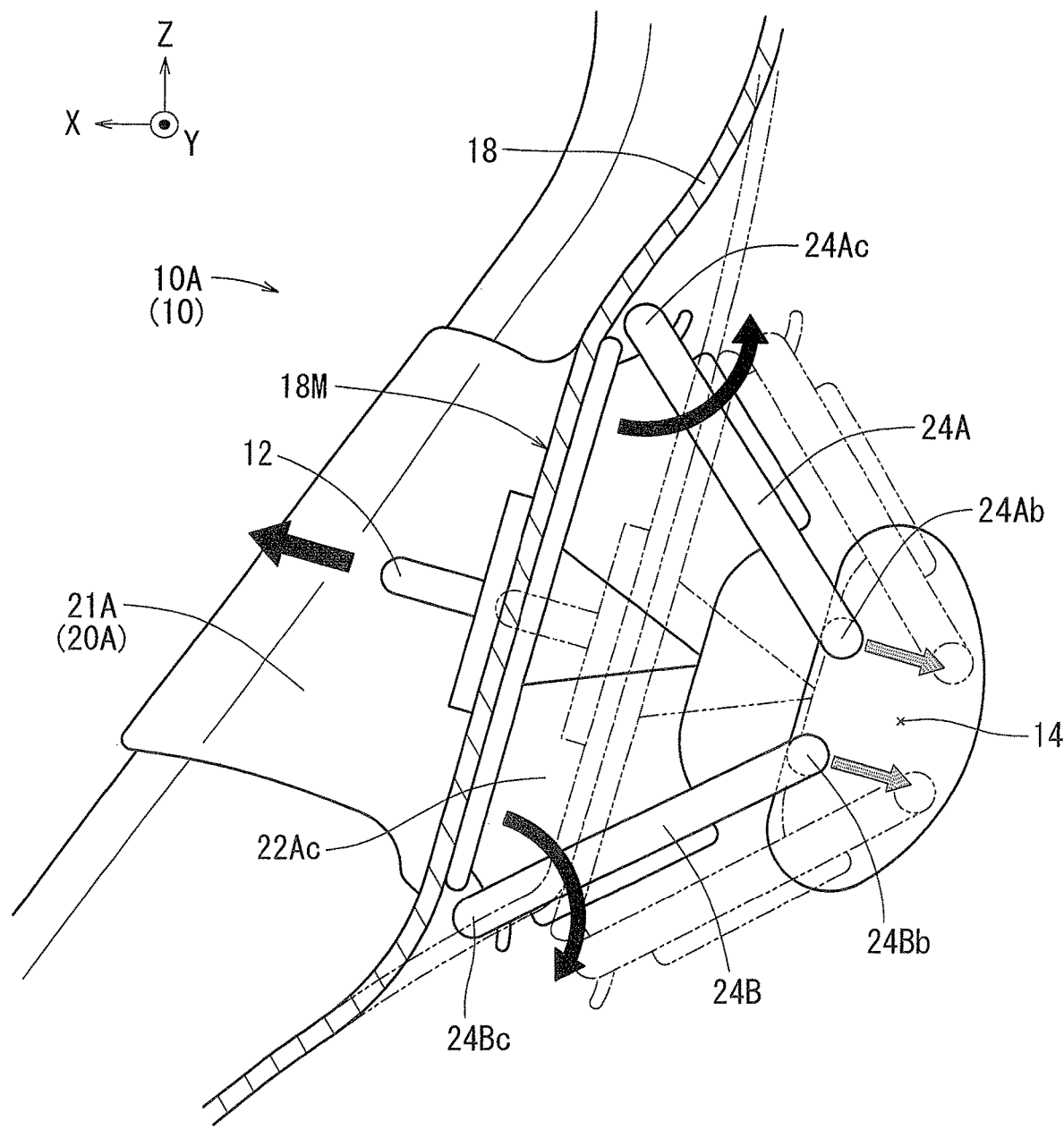
FIG. 5 is an explanatory view illustrating a movement of the striker mounting structure of FIG. 1 in the event of the side collision.
Figure 6:
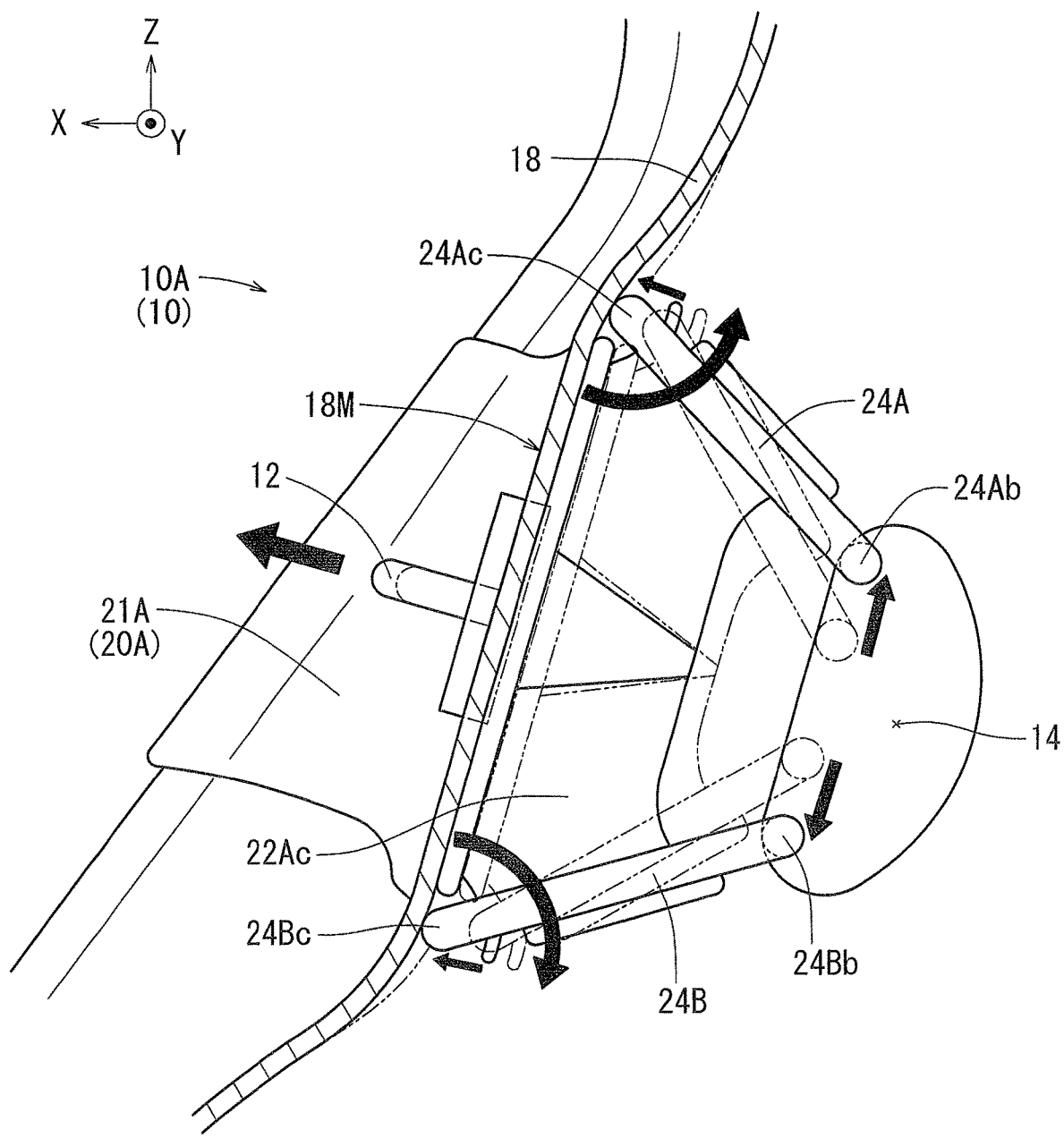
FIG. 6 is an explanatory view illustrating a movement of the striker mounting structure of FIG. 1 in the event of the side collision.

FIGS. 4, 5, and 6 illustrate movement of the striker mounting structure 10A during a side collision. The two-dotted chain lines in FIGS. 4 and 5 indicate the position of the striker 12 before the side collision; the solid lines indicate the position of the striker 12 during a side collision.

As shown in FIG. 4 and FIG. 5, in the event of a side collision, the door rear end portion moves toward the front of the vehicle body when, for example, the door is deformed. As a result, the hook 16 (see FIG. 1) on the door moves forward (in a direction indicated by an arrow). As a result, the hook 16 pulls the striker 12 in the forward direction. The movement of the striker 12 causes the entire reinforcement member 20A to move in the forward direction of the vehicle body. As the reinforcement member 20A moves forward, the locking portions 24Ab, 24Bb of the connecting rods 24A, 24B are moved to abut the edges of the insertion hole 14 formed in the reinforcement 4. This abutment with the reinforcement 4 prevents the connecting rods 24A, 24B from further moving in the forward direction. As indicated in FIG. 5, a reaction force (indicated by the semi-transparent (grey) arrows) in the backward direction of the vehicle body is applied to the connecting rods 24A, 24B from the reinforcement 4. This, plus the abutment with the insertion hole 14, causes a rotational force to act on the connecting rods 24A, 24B, in particular rotation about the fixing end portions 24Ac, 24Bc. This and subsequent movements are described in greater detail below.

As shown in FIG. 6, the rod portions 24Aa, 24Ba of the connecting rods 24A, 24B are angled with respect to the direction in which the load is being applied. The connecting rods 24A, 24B thus receive rotational forces about their respective fixing end portions 24Ac, 24Bc. These rotational forces enable the locking portions 24Ab, 24Bb to move along the front wall edge of the insertion hole 14 of the reinforcement 4. For instance, one of the locking portions 24Ab of the connecting rod 24A moves in the upward direction, so as to be abutted to the upper portion of the hole edge of the insertion hole 14. The other locking portion 24Bb of the other connecting rod 24B moves in the downward direction and is abutted to the lower portion of the hole edge of the insertion hole 14. As the locking portions 24Ab, 24Bb move along the front wall edge of the insertion hole 14, the fixing portions 22Ab1, 22Bb1 begin to be bent by the respective rod portions 24Aa, 24Ba. Alternatively or additionally, the top portion 22Ac2 of the reinforcement plate 22Ac may be bent toward the passenger compartment, for instance about the ridge lines 22Ac1. These bending movements help further absorb some of the impact force before it is applied with greater strength to reinforcement member 21A and/or the reinforcement 4. When the door further deforms and the striker 12 moves further forward, the reinforcement member 21A or/and the reinforcement 4 gradually deform(s).

Figure 9:
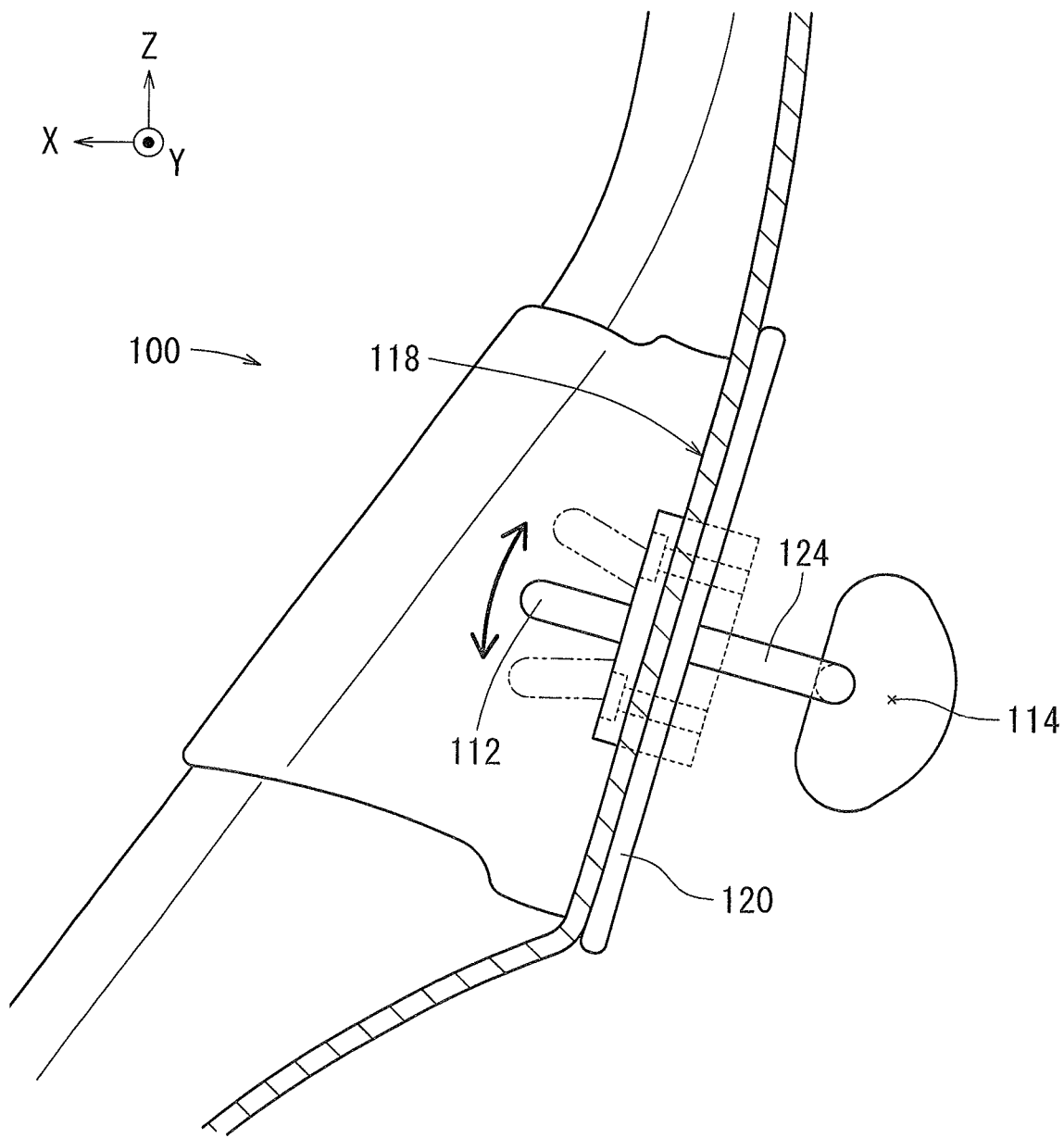
FIG. 9 is an explanatory view illustrating a movement of a striker mounting structure with one connecting rod.

The use of a plurality of connecting rods 24A, 24B prevents the striker 12 from being inclined, for instance in the up or down direction, during the side collision. In contrast, if only one connecting rod is provided, as shown in FIG. 9, a striker 112 may be inclined/bent during a side collision about the portion where the striker 112 is locked in the insertion hole 114, for example due to rotation of the connecting rod 124. The present embodiment, on the other hand, may prevent such a bending movement of the striker 12 with respect to the insertion hole 14 of the reinforcement 4. The hook 16 is therefore prevented from being removed from the striker 12. Accordingly, entry of the door into the passenger compartment may be prevented or delayed, as the reinforcement member 21A and the reinforcement 4 are gradually deformed during the side collision.

Figure 7:
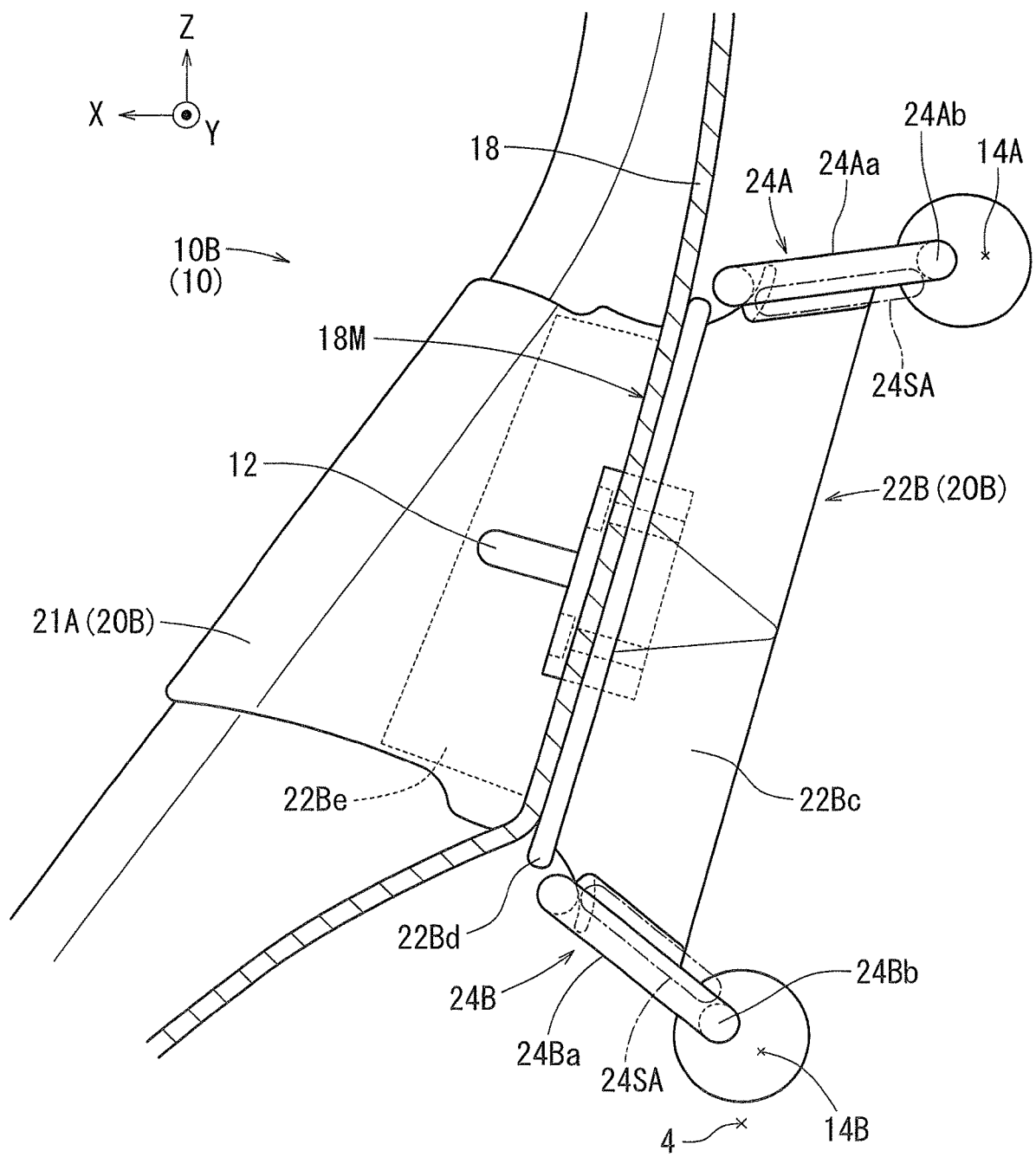
FIG. 7 is an explanatory view of a striker mounting structure according to a second embodiment.

FIG. 7 shows a striker mounting structure 10B (10) according to a second embodiment. The striker mounting structure 10B according to the second embodiment may include a reinforcement member 20B (21A, 22B) alternative to the reinforcement member 20A (21A, 22A) shown in FIGS. 2 and 4. Additionally, the reinforcement 4 may include two insertion holes 14A, 14B, as shown in FIG. 7, in contrast to the one insertion hole 14 shown in FIG. 4.

As shown in FIG. 7, the reinforcement member 22B may have substantially a Z-shaped configuration in the top view. The reinforcement member 22B may also include a plate-like main body 22Bd, a flange 22Be, and a reinforcement plate 22Bc. The flange 22Be extends from the inner edge, closer to the passenger compartment, of the plate-like main body 22Bd in a direction away from the reinforcement 4, for example, in the forward direction. The reinforcement plate 22Bc extends from the outer edge, away from the passenger compartment, of the plate-like main body 22Bd in a direction toward the reinforcement 4, for example, in the backward direction.

As shown in FIG. 7, two connecting rods 24A, 24B may be attached to the reinforcement member 20B. The rod portion 24Aa of the first connecting rod 24A is fixed along the upper edge of the reinforcement plate 22Bc. The rod portion 24Ba of the second connecting rod 24B is fixed along the lower edge of the reinforcement plate 22Bc. The interval between the rod portions 24Aa, 24Ba gradually increases toward the backward direction. The locking portions 24Ab, 24Bb extend from the rear ends of the rod portions 24Aa, 24Ba toward the inside of the passenger compartment. The locking portions 24Ab, 24Bb are inserted in respective insertion holes 14A, 14B of the reinforcement 4.

As shown in FIG. 7, the locking portions 24Ab, 24Bb may be provided at the rear portions of respective connecting rods 24A, 24B. The first locking portion 24Ab is inserted in the first insertion hole 14A formed in the reinforcement 4. The second locking portion 24Bb is inserted in the second insertion hole 14B formed in the reinforcement 4.

As shown in FIG. 7, the first and second connecting rods 24A, 24B are fixed to an upper portion and a lower portion of the reinforcement plate 22Bc, respectively. The interval between the rod portions 24Aa, 24Ba of the connecting rods 24A, 24B gradually increases toward the backward direction. Alternatively, as shown in FIG. 3, the interval between the rod portions 24Aa, 24Ba may become smaller toward the backward direction. At least one part of the interval changing part 24SA of each of the rod portions 24Aa, 24Ba, where the interval therebetween changes, are fixed to the reinforcement plate 22Bc.

As shown in FIG. 4, in the event of a side collision, the door rear end portion may move in the forward direction when the door is deformed. In this case, the hook 16 (see FIG. 1) formed on the door pulls the reinforcement member 20B in the forward direction via the striker 12. This allows the connecting rod 24A attached to the reinforcement member 20B to move in the forward direction. The locking portion 24Ab of the connecting rod 24A accordingly moves in the forward and downward direction so as to abut a lower front edge of the insertion hole 14A. The other locking portion 24Bb of the other connecting rod 24B accordingly moves in a forward and upward direction so as to abut an upper front edge of the insertion hole 14B. Further, when the door deforms and the hook 16 pulls the striker 12 still further in the forward direction, the reinforcement member 20B and/or the reinforcement 4 is/are gradually deformed.

Figure 8:
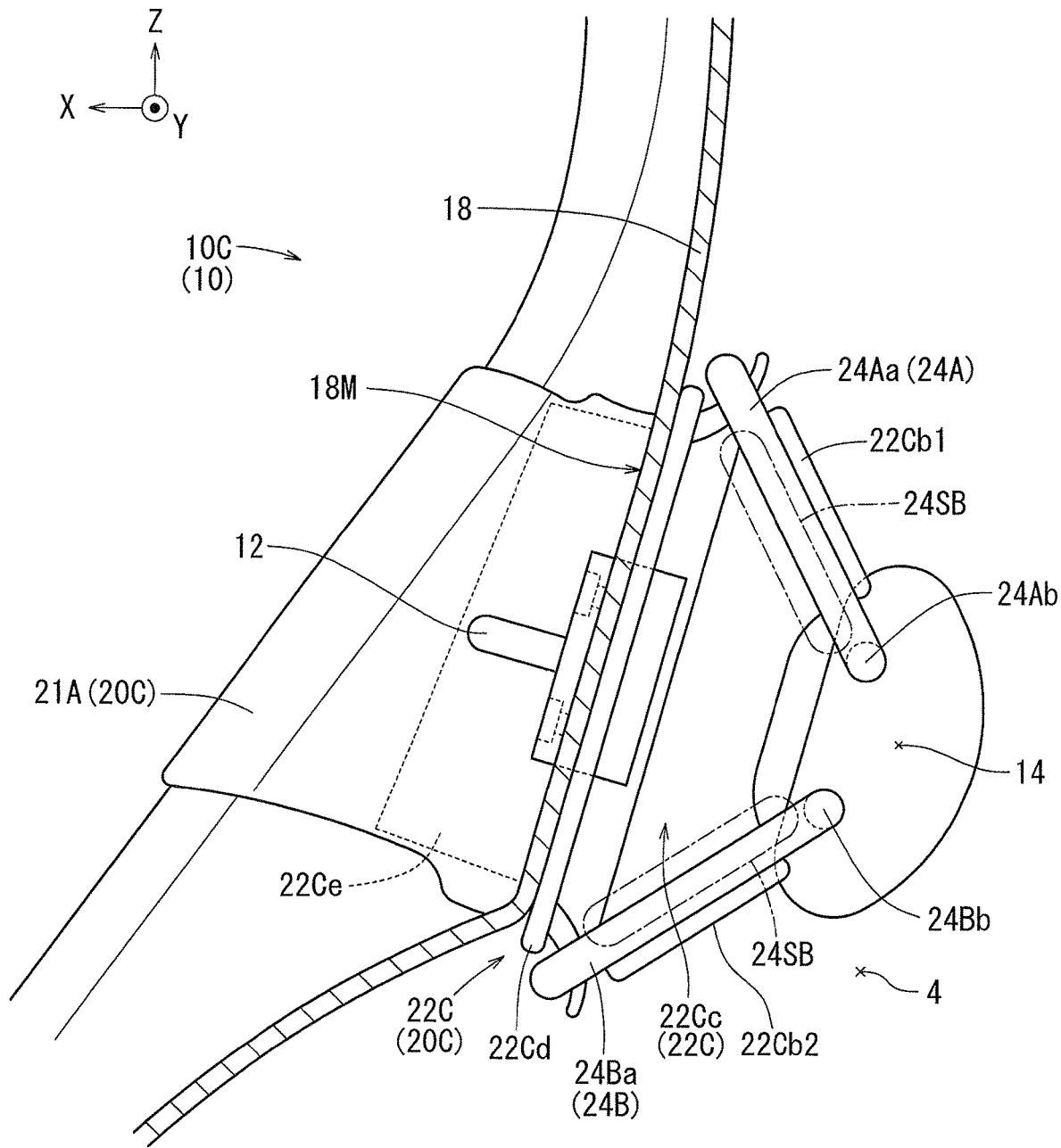
FIG. 8 is an explanatory view of a striker mounting structure according to a third embodiment.

The reinforcement 4 shown in FIG. 7 may include two insertion holes 14A, 14B. Therefore, the force to be applied to the reinforcement 4 may be dispersed in two spots, as compared with the reinforcement 4 having only one insertion hole 14 as shown in FIG. 3. As a result, the deformation of the reinforcement 4 may be further delayed and the entry of the door in the passenger compartment may be prevented or delayed FIG. 8 shows a striker mounting structure 10C (10) according to a third embodiment. The striker mounting structure 10C may include a reinforcement member 20C (21A, 22C), shown in FIG. 8, alternative to the reinforcement members 20A (21A, 22A) shown in FIGS. 2, 4.

As shown in FIG. 8, the reinforcement member 22C may include a plate-like main body 22Cd, a flange 22Ce, and a reinforcement plate 22Cc. The flange 22Ce extends from the inner edge, the edge nearer the passenger compartment, of the plate-like main body 22Cd in a direction away from the reinforcement 4, for example, in the forward direction. In this embodiment, the reinforcement plate 22Cc is a separate component from the plate-like main body 22Cd and is attached to the plate-like main body 22Cd. The reinforcement plate 22Cc may extend, for example, from an area near the inner edge, an edge nearer the passenger compartment, of the plate-like main body 22Cd in the direction toward the reinforcement 4, for example, in the backward direction.

As shown in FIG. 8, the fixing portions 22Cb1, 22Cb2 are formed at both of the upper and lower ends of the reinforcement plate 22Cc. The fixing portions 22Cb1, 22Cb2 may include, for example, a semicircular bottom surface, which confoinis to the shape of the rod portions 24Aa, 24Ba of the connecting rods 24A, 24B. The rod portions 24Aa, 24Ba are welded to the inner peripheral surfaces of the fixing portions 22Cb1, 22Cb2.

As shown in FIG. 8, the rod portion 24Aa of the first connecting rod 24A extends along the upper edge of the reinforcement plate 22Cc in the forward/backward direction. The rod portion 24Ba of the second connecting rod 24B extends along the lower edge of the reinforcement plate 22Cc in the forward/backward direction. The interval between the rod portions 24Aa and 24Ba, generally located at the interval changing portion 24SB, gradually becomes smaller in the backward direction. The locking portions 24Ab, 24Bb extend from the rear ends of the rod portions 24Aa, 24Ba toward the inside of the passenger compartment. The locking portions 24Ab, 24Bb are inserted in the insertion hole 14 of the reinforcement 4.

The shapes of the striker 12 and the hook 16 are not limited to those illustrated in FIG. 1, and may have different shapes as long as the hook can be locked by the striker.

The striker mounting structure 10 may include two connecting rods 24A, 24B as shown, for example, in FIG. 2. Alternatively, the striker mounting structure 10 may have three or more connecting rods. One end of each of the three connecting rods may be inserted in one insertion hole formed in the reinforcement 4. Alternatively, the one end of each of the three connecting rods may be inserted in a plurality of insertion holes formed in the reinforcement 4.

The reinforcement member 22A illustrated in FIGS. 2, 4 and the reinforcement member 22B illustrated in FIG. 7 may have the plate-like main bodies 22Ad, 22Bd and the reinforcement plates 22Ac, 22Bc integrally formed as a single member. Alternatively, the reinforcement plates 22Ac, 22Bc may be separate components from the plate-like main bodies 22Ad, 22Bd and may be attached to the plate-like main bodies 22Ad, 22Bd.

The various examples described above in detail with reference to the attached drawings are intended to be representative of the present disclosure and are thus non-limiting embodiments. The detailed description is intended to teach a person of skill in the art to make, use, and/or practice various aspects of the present teachings, and thus does not limit the scope of the disclosure in any manner. Furthermore, each of the additional features and teachings disclosed above may be applied and/or used separately or with other features and teachings in any combination thereof, to provide an improved striker mounting structure, and/or methods of making and using the same.

What is claimed is:

1. A striker mounting structure, comprising:
   a reinforcement provided on a vehicle body and formed with one or more insertion hole;
   an outer panel for covering the reinforcement that has a striker mounting surface arranged to be spaced apart from the reinforcement;
   a reinforcement member fixed to the striker mounting surface and a striker; and
   a first connecting rod connected to the reinforcement member, the first connecting rod having a first locking portion extending from the reinforcement member so as to extend into one of the one or more insertion hole formed in the reinforcement; and
   a second connecting rod connected to the reinforcement member, the second connecting rod having a second locking portion extending from the reinforcement member so as to extend into one of the one or more insertion hole formed in the reinforcement,
   wherein:
   the reinforcement member abuts a rear surface of the striker mounting surface, the rear surface facing the reinforcement, and
   the striker abuts a front surface of the striker mounting surface, the front surface being opposite to the rear surface.

2. The striker mounting structure according to claim 1, wherein:
   a hook is provided on a rear end of a vehicle door and is configured to hook the striker, and
   the striker mounting surface is located in front of the reinforcement.

3. The striker mounting structure according to claim 1, wherein:
   the one or more insertion hole opens in a direction away from a passenger compartment,
   each of the first and second connecting rods includes a rod portion extending in a forward/rearward direction of a vehicle, and
   the first and second locking portions extend from the rod portion in a direction toward the passenger compartment.

4. The striker mounting structure according to claim 1, wherein the first and second connecting rods are aligned in an upward/downward direction.

5. The striker mounting structure according to claim 1, wherein an interval between the first and second connecting rods increases or reduces in a direction toward the one or more insertion hole.

6. The striker mounting structure according to claim 1, further comprising a reinforcement plate extending from the reinforcement member toward the reinforcement.

7. The striker mounting structure according to claim 6, wherein the connecting rods are fixed to the reinforcement plate.

8. The striker mounting structure according to claim 7, wherein:
   the first connecting rod extends along an upper end of the reinforcement plate,
   the second connecting rod extends along a lower end of the reinforcement plate, and
   an interval between the first connecting rod and the second connecting rod increases or reduces in a direction toward the reinforcement member.

9. The striker mounting structure according to claim 6, wherein:
   the reinforcement plate is a separate component from the reinforcement member, and
   the reinforcement plate is attached to the reinforcement member.

10. The striker mounting structure according to claim 6, wherein the reinforcement plate includes a ridge line extending in a forward/backward direction so as to form a convex shape a direction away from a passenger compartment or a direction toward the passenger compartment.

11. The striker mounting structure according to claim 1, wherein the first and second locking portions extend into the same insertion hole.

12. The striker mounting structure according to claim 1, wherein the first and second locking portions extend into different insertion holes.

13. The striker mounting structure according to claim 1, wherein an interval between the first and second locking portions is smaller than a longest length of a striker plate of the striker.

14. The striker mounting structure according to claim 1, wherein the first and second locking portions are configured to move in opposite directions within the one or more insertion hole during a collision.

15. A striker mounting structure, comprising:
   a reinforcement provided on a vehicle body and formed with one or more insertion hole;
   an outer panel for covering the reinforcement that has a striker mounting surface arranged to be spaced apart from the reinforcement;
   a reinforcement member fixed to the striker mounting surface and a striker; and
   a first connecting rod connected to the reinforcement member extending toward the one or more insertion hole; and
   a second connecting rod connected to the reinforcement member extending toward the one of more insertion hole, wherein:

the first and second connecting rod are tilted with respect to each other.

16. The striker mounting structure according to claim 15, wherein the first and second connecting rods extend toward the same insertion hole.

17. The striker mounting structure according to claim 15, wherein the first and second connecting rods extend in a direction away from the reinforcement so as to be tilted toward each other.

18. The striker mounting structure according to claim 15, wherein the first and second connecting rods extend in a direction away from the reinforcement so as to be tilted away from each other.

19. A striker mounting structure, comprising:
- a reinforcement provided on a vehicle body and formed with one or more insertion hole;
- an outer panel for covering the reinforcement that has a striker mounting surface arranged to be spaced apart from the reinforcement;
- a reinforcement member fixed to the striker mounting surface and a striker; and
- a first connecting rod connected to the reinforcement member, the first connecting rod having a first locking portion extending from the reinforcement member so as to extend into the one or more insertion hole formed in the reinforcement, wherein:
- the first locking portion is spaced apart from an opening edge of the one or more insertion hole, wherein:
- the reinforcement member abuts a rear surface of the striker mounting surface, the rear surface facing the reinforcement, and
- the striker abuts a front surface of the striker mounting surface, the front surface being opposite to the rear surface.

* * * * *